Oct. 2, 1928.
G. P. BRAND
1,686,225
TRANSMISSION AND TRACKER MECHANISM UNIT
Filed Dec. 23, 1924     6 Sheets-Sheet 2
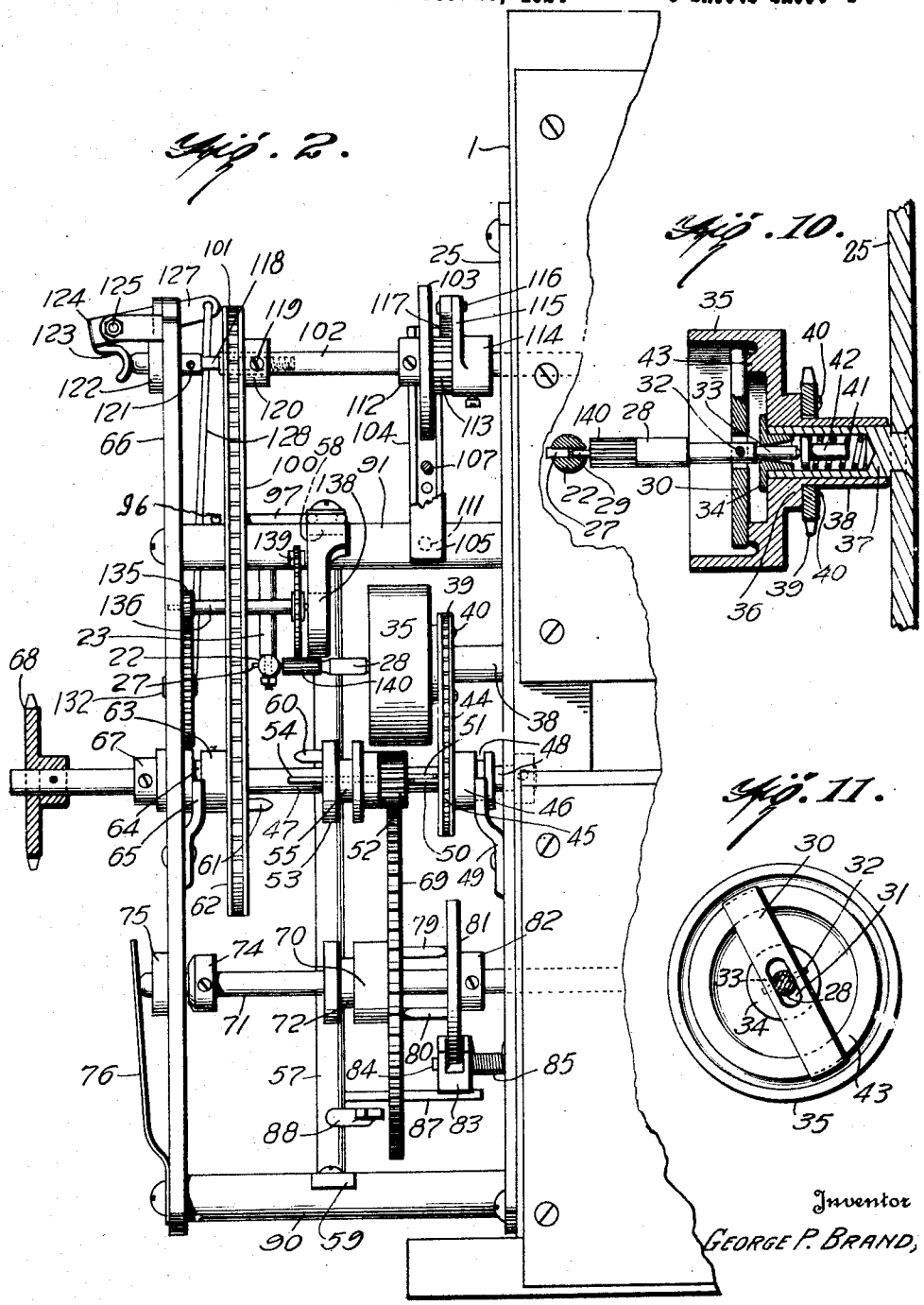

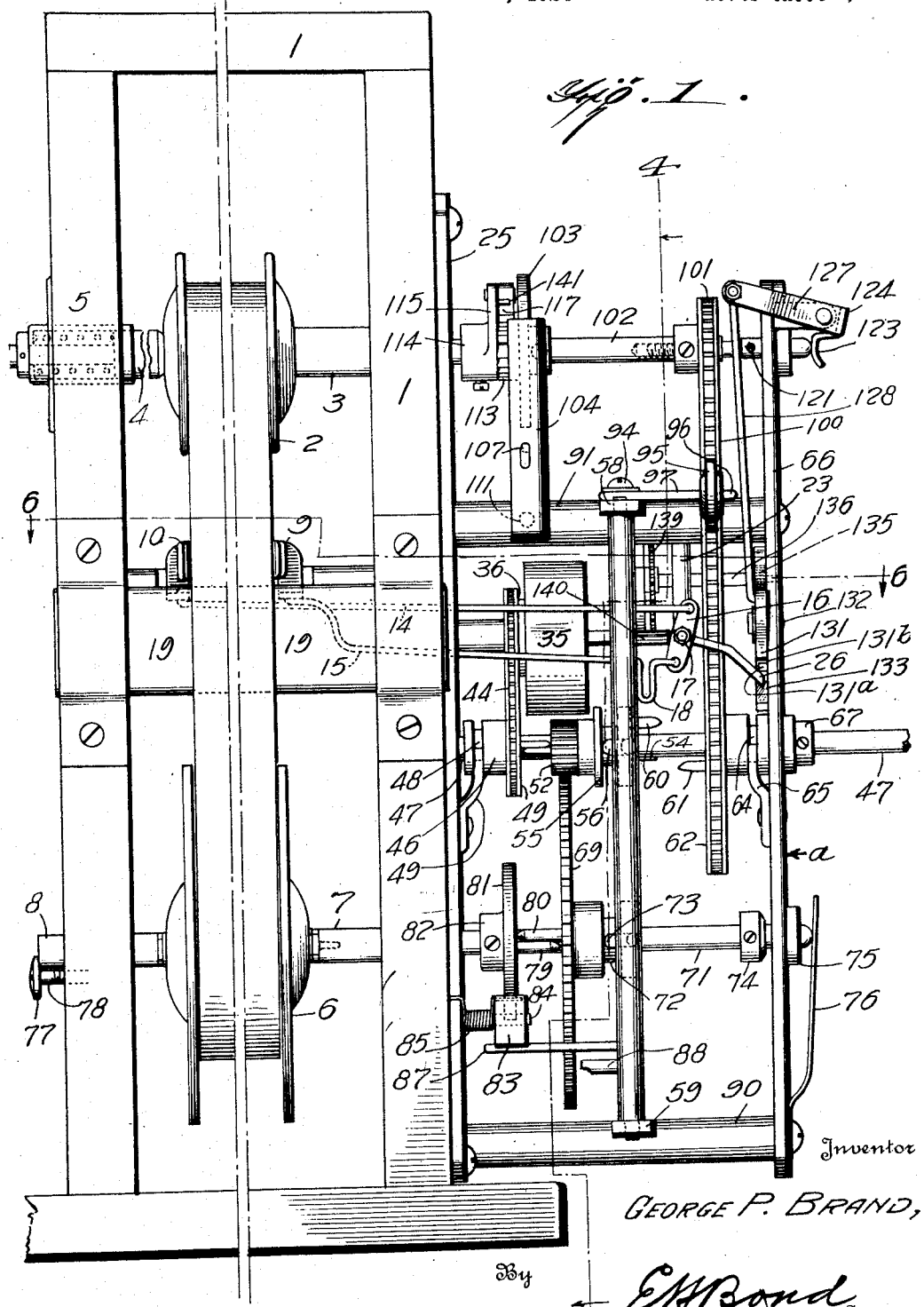

Oct. 2, 1928.
G. P. BRAND
1,686,225
TRANSMISSION AND TRACKER MECHANISM UNIT
Filed Dec. 23, 1924   6 Sheets-Sheet 3
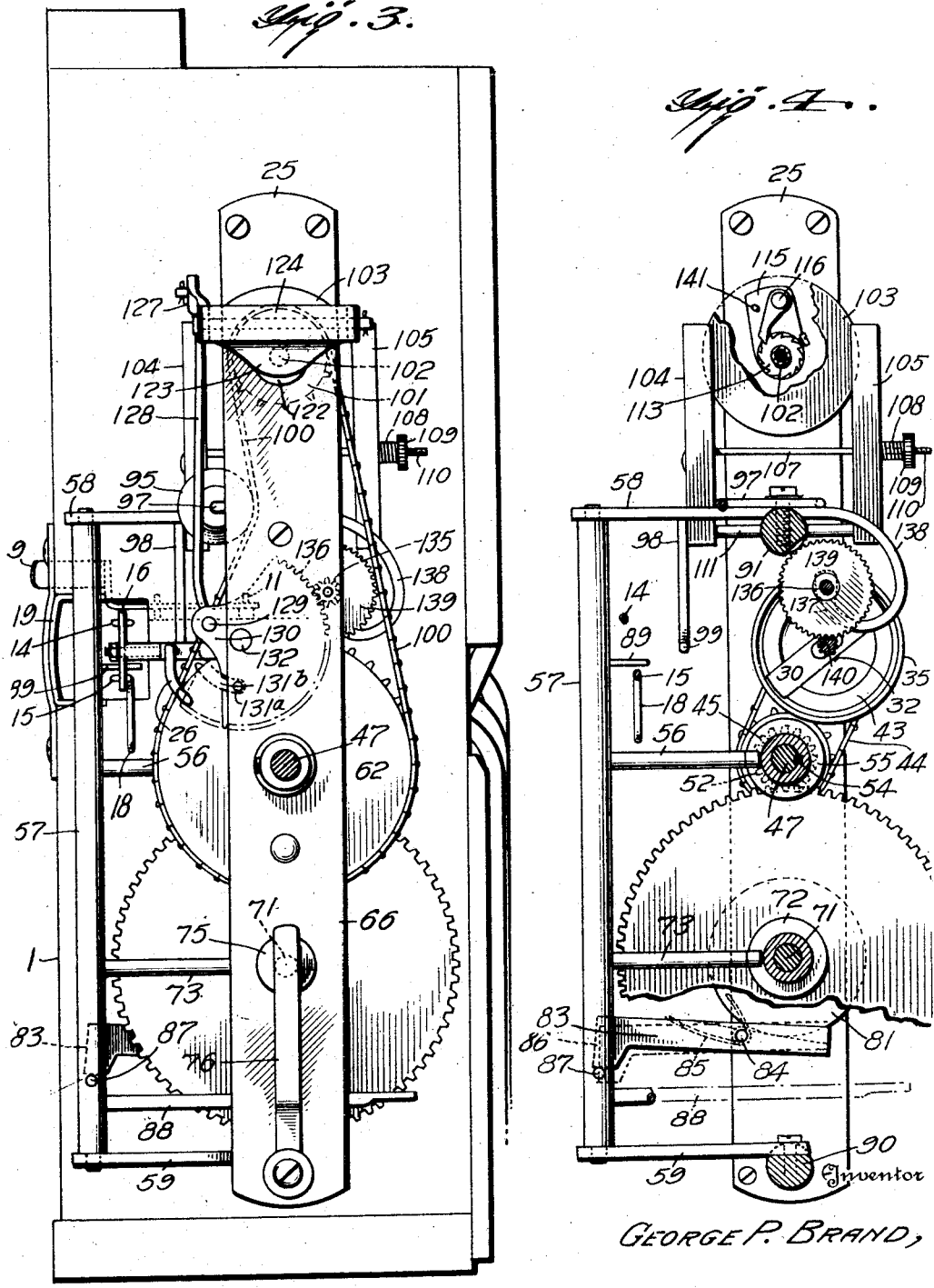
Inventor
GEORGE P. BRAND,
By
E. K. Bond, Attorney

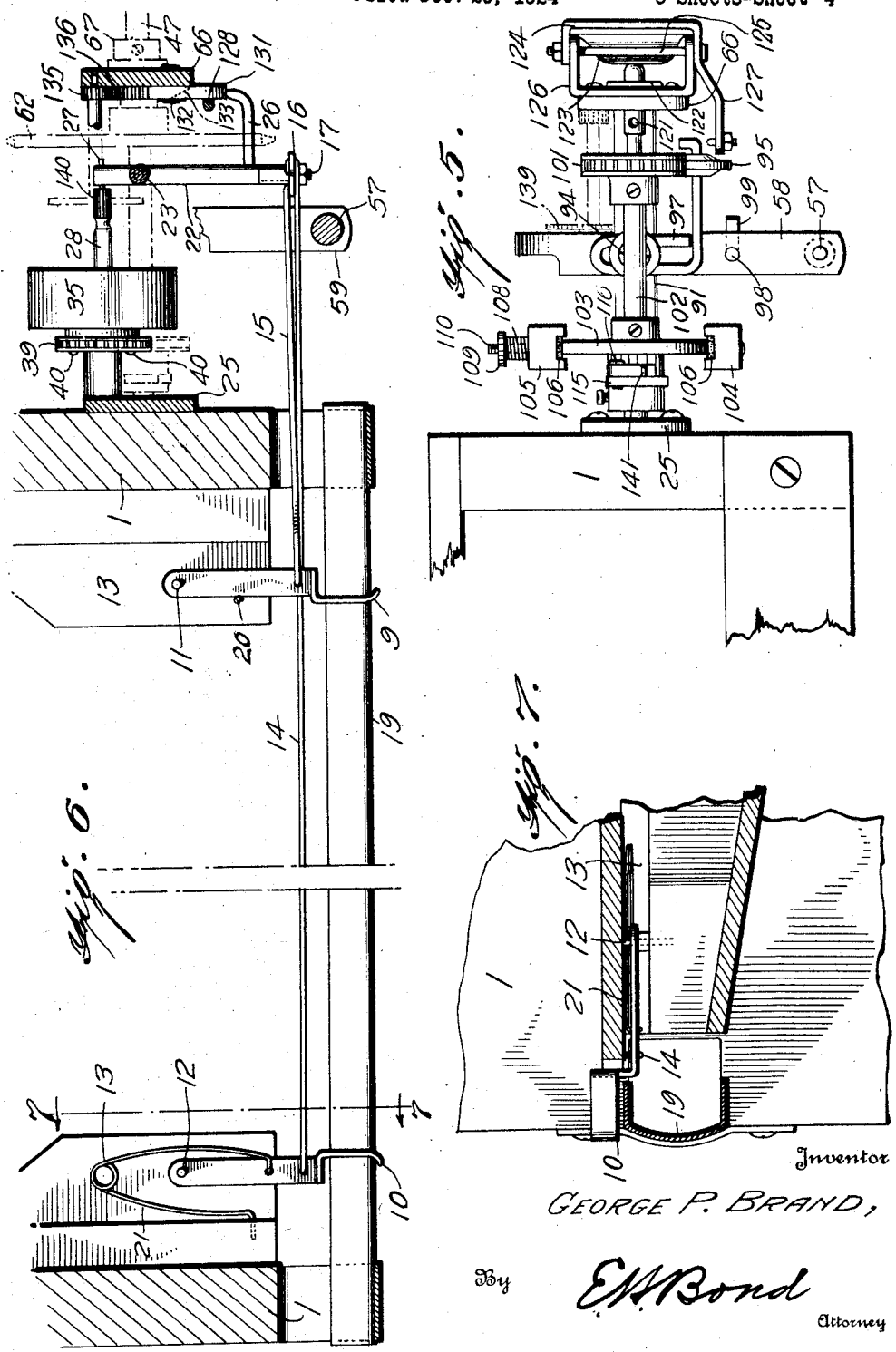

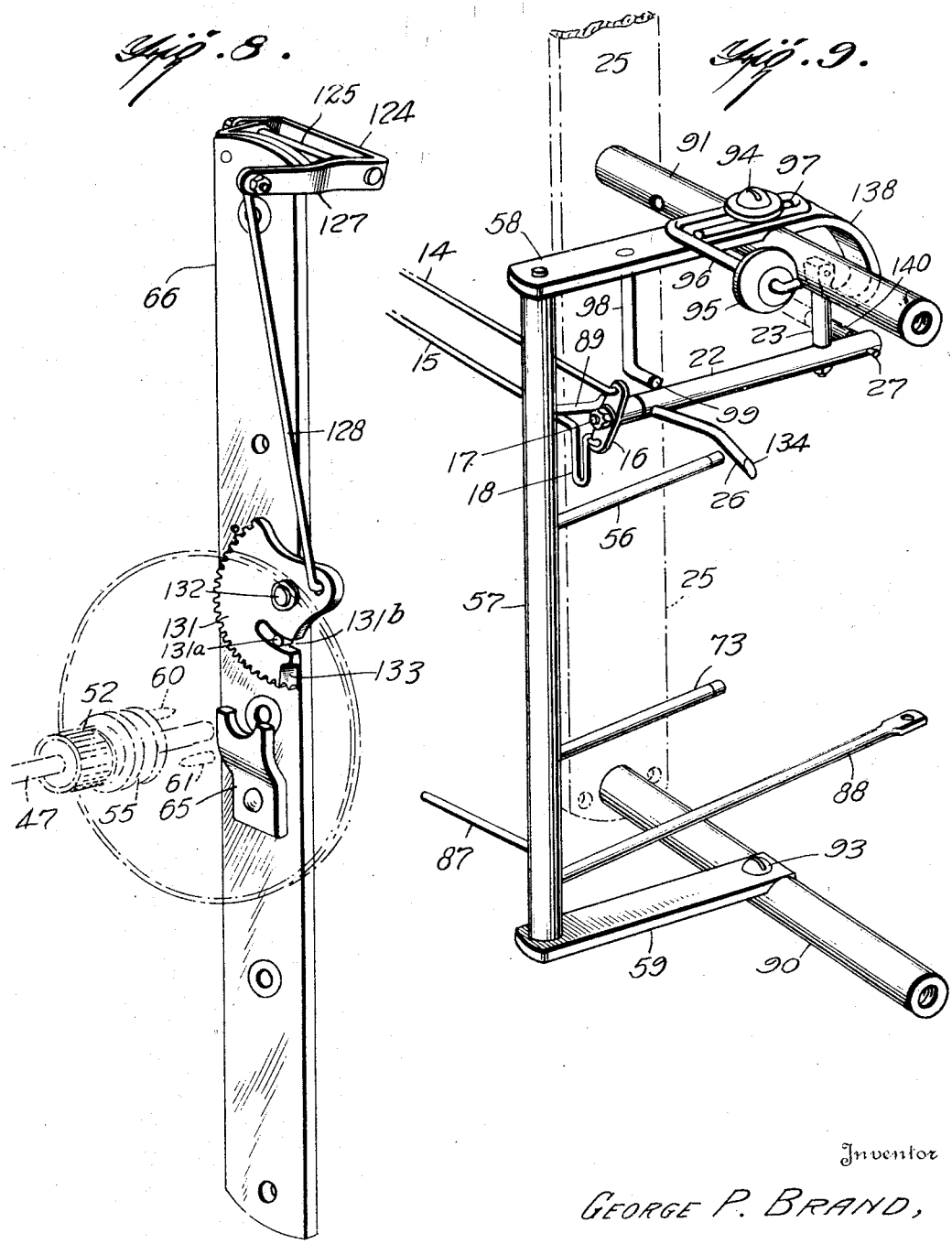

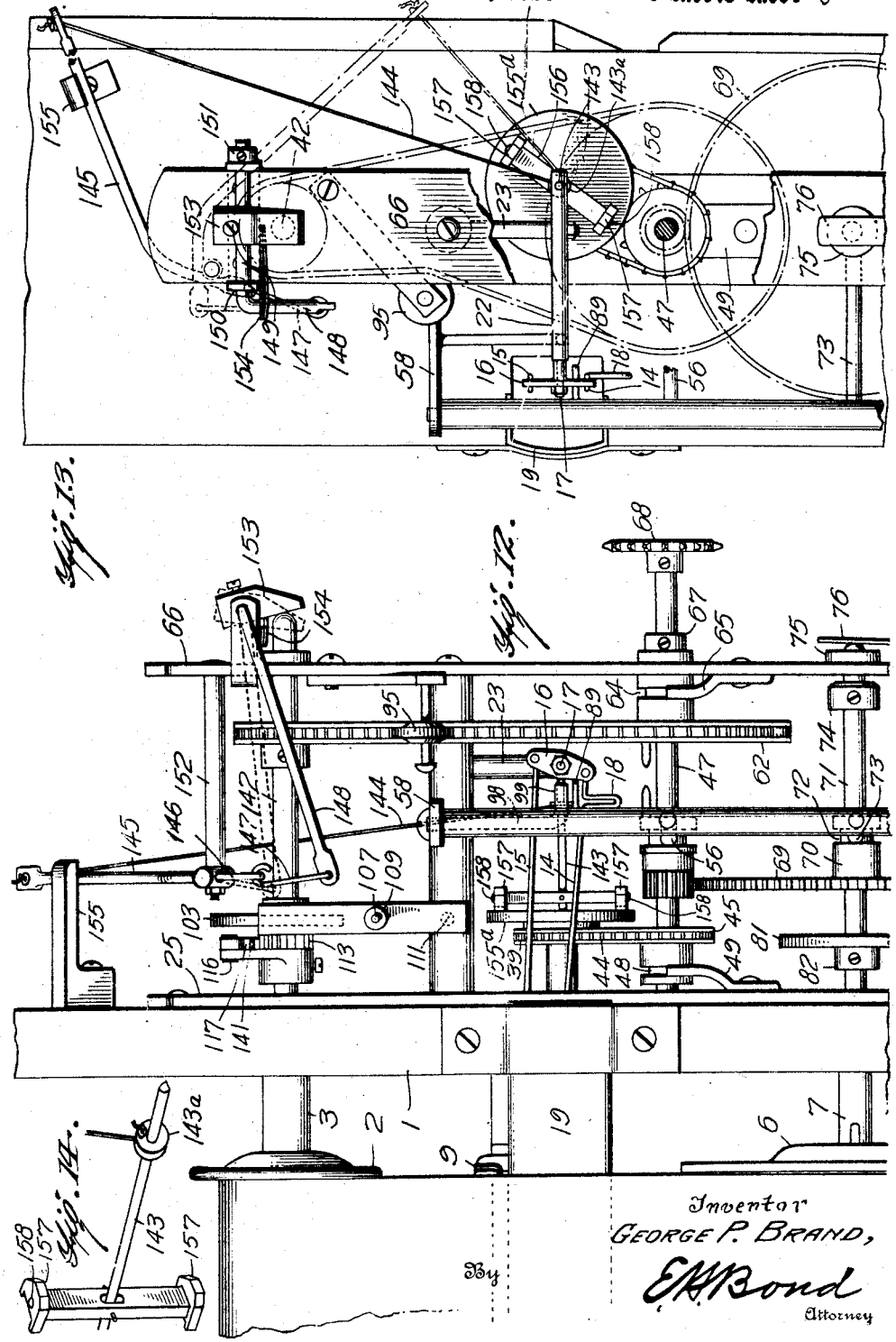

Patented Oct. 2, 1928.

1,686,225

UNITED STATES PATENT OFFICE.

GEORGE P. BRAND, OF WESTPORT, CONNECTICUT.

TRANSMISSION AND TRACKER MECHANISM UNIT.

Application filed December 23, 1924. Serial No. 757,628.

This invention relates to certain new and useful improvements in bodily detachable combined transmission and tracker mechanism for player pianos and other automatic musical instruments, and other devices in which use is made of perforated control sheets.

The present invention has for its objects among others to provide an improved simplified unit for removable attachment to the spool box of the instrument, with all parts readily accessible and detachable, and arranged at one end of the box. The supporting frame structure constitutes in part portions of the mechanism thus reducing the parts, and hence the cost of manufacture, and lessening the liability of derangement and injury, as well as making less parts to need attention, or to become displaced in transportation.

I further so construct the supporting frame that a portion thereof carries parts of the transmission mechanism as well as parts of the tracking mechanism, and when this removable part of the frame is removed it provides ready access to the other parts of both the transmission and the tracker mechanism. This permits me to construct the frame of parts readily produced of stock material, requiring but minimum labor in assemblage, and hence readily and quickly replaced in case of necessity, which will however seldom occur.

I so mount one member of the transmission mechanism on the frame that its movement shifts the gears of the transmission in unison while in mesh, as well as throwing the edge guides away from the paper and vice versa, and at the same time actuating the take-up spool brake. The brake for the music roll is automatic in its operation, being mounted for freedom of movement practically without pressure or friction upon the bearings, allowing free endwise movement of the music roll.

I provide a simple improved friction device actuated and controlled by the conjoint action of the transmission mechanism and the lateral pressure of the music sheet, the latter controlling the endwise movement of the music roll.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which Fig. 1 is a front elevation with portions broken away, showing my present improvement.

Fig. 2 is a face view looking at the side opposite to that seen in Fig. 1, showing the frame with the transmission and tracker mechanisms only.

Fig. 3 is an end view, looking in the direction of the arrow $a$ in Fig. 1, with the drive shaft in cross section and the drive sprocket removed.

Fig. 4 is a vertical cross section as on the line 4—4 of Fig. 1 looking in the direction of the arrows.

Fig. 5 is a top plan with parts removed for the sake of clearness.

Fig. 6 is a cross section as on the line 6—6 of Fig. 1.

Fig. 7 is a vertical cross section, as on the line 7—7 of Fig. 6, looking in the direction of the arrows.

Fig. 8 is a perspective view of the front member of the frame removed together with the parts removable therewith.

Fig. 9 is a perspective view of the rear member of the frame with some of its associated parts, others being removed for the sake of clearness.

Fig. 10 is a substantially central section through the friction element.

Fig. 11 is a face view of the friction element.

Fig. 12 is a front elevation showing a modified form of tracker mechanism.

Fig. 13 is an end view of the same.

Fig. 14 is a perspective detail of one of the friction elements and its shaft.

Like numerals of reference indicate like parts throughout the several views.

Referring now to the details of the drawings, 1 designates the spool box, in this instance, of a player piano, or the like, 2 the music roll or spool mounted in the usual way upon spool shafts such as 3 and 4, the latter being of the usual or any preferred form of yielding type, 5 being the spring enclosed within the tubular member and pressing against the end of the spool shaft 4 and normally tending to force the music spool to the right.

6 is the take up spool or roll mounted on shafts 7 and 8 and upon which the music sheet is wound as the playing proceeds.

9 and 10 are edge guides pivotally mounted at their rear ends as at 11 and 12, upon some suitable supports as 13 within the box 1 as seen best in Fig. 6. The edge guide 10 has connected thereto between its operative portion and its pivot a rod or wire 14, while 15 is a rod or wire having one end connected to the edge guide 9, the other ends of the rods or wires 14 and 15 being connected with the upper and lower ends respectively of a substantially upright arm 16, as seen clearly in Fig. 1, the said arm being mounted for free pivotal movement upon a lateral member 17, soon to be described.

19 is the tracker bar of the usual type. It is relatively fixed, except in transposing, so as to be immovable in the operation of the device. 21 is a spring secured to the support 13 on which the left hand edge guide 10 is pivotally mounted as seen in Fig. 6, one end being affixed in any suitable manner in the said support and the other end being connected with the edge guide at a point between the pivot of the latter and its outer end, as seen clearly in said Fig. 6, tending to force the said edge guide toward the right.

As seen in Fig. 1, the connecting rod or wire 15 is formed with a loop portion 18 for the purpose of ready adjustment of the music sheet with relation to the tracker bar. Opening of the loop or bend 18 increases the distance from its connection with the arm 16 and the right hand edge guide 9 and by reason of the pivotal movement of the said arm 16 throws the left hand edge guide 10 to the left, thus increasing the distance between the two edge guides. Pinching the loop together decreases the distance, thus bringing the edge guides closer together. 20 is a stop pin rising from the support of the right hand edge guide for the purpose of limiting the movement of the right hand edge guide to the left. This, in conjunction with the spring 21, insures that the two edge guides shall be held in proper distance apart, which in practice is eleven and three sixteenths of an inch. The pin 20 is bendable and in practice is bent in one direction or the other as may be necessary to effect the proper distance between the edge guides.

As shown, the edge guides are formed with outturned outer edges or ends, and one of the main purposes of the pin 20 is to insure that the distance between the edge guides shall be that above mentioned so that the music sheet will insert itself between the edge guides when put in position and drawn over the tracker bar and attached to the take up spool or roll. But for this provision for limiting the distance between the edge guides the edge guides would approach each to such an extent that the music sheet would not clear the top of the edge guides, but would ride thereon.

The arm 16 rocks loosely upon its support 17, the latter being carried by the forwardly-projecting member 22 mounted for oscillatory movement in a horizontal direction on a vertical pivot 23 projecting downwardly from the lateral member 91 projecting from the upright member 25 of the frame, as seen clearly in Fig. 9.

26 is a bent arm carried by the member 22 as seen in Fig. 9, for a purpose soon to be described. The inner end of the member 22 carries a thrust pin 27 for the purpose of regulating or adjusting the normal position of the member 22. 28 is the shaft of the friction element, the latter having a pin 29 engaged loosely in and revolving in an opening in the member 22, as seen in Fig. 10, the adjacent ends of the pins 27 and 29 being in engagement with each other. The opening in the member 22 in which the pin 29 is received is slightly greater in diameter than that of the pin 29 to permit of the rocking movement of the member 22.

30 is a friction member in the form of a bar as seen best in Fig. 11, having an oblong opening 31 therein as seen best in said Fig. 11, in which is fixed a pin 32 on which the member 30 is pivoted for rocking movement in the direction of the length of the opening.

The end of the shaft 28 has a reduced portion 33, as seen in Fig. 10 which is loosely received in the bore of a bushing 34, which serves as a bearing for the inner end of the shaft 28, as also seen in Fig. 10. This bushing serves in connection with the hub of the cooperating member of the friction member to prevent the latter from endwise movement.

35 is the cooperating member of the friction element. This member has a hub 36 embracing the shaft 37 mounted rigidly in the upright 25 of the frame, as seen best in Fig. 10, and adapted to revolve thereon. Sleeved upon the shaft 37 is the sleeve portion 38 of the hub and upon this is placed a sprocket wheel 39, which may be secured by suitable means as screws or the like 40 engaged in the hub proper 36 of the friction element 35 as seen in Fig. 10. The shaft 37 is bored as seen in Fig. 10, and in this bore is a spring 41 within which is a headed member 42, between the head of which and the bottom of the bore the spring is arranged and the head bearing against the inner end of the reduced portion 33 of the shaft 28, all as clearly shown in Fig. 10.

The friction member 35 is, as shown in Fig. 10, of cup shape to serve as a protection against the grease and oil getting to the acting faces of the member 30 and the face of the track 43 on which the said friction member 30 travels.

44 is the chain connecting the sprocket wheel 39 with a sprocket 45 having a hub 46 loosely mounted on a shaft 47 in a suitable bearing in the upright member 25 of the frame, the said hub having an upright annular groove 48 in which is connected a forked arm 49 secured to the member 25 in any suitable way to prevent endwise movement of the hub, and consequently the sprocket wheel carried thereby. This sprocket wheel carries a laterally projecting pin 50 as seen in Fig. 2 designed for cooperation and engagement with a lateral pin 51 projecting in the opposite direction from a pinion 52 having a hub 53 mounted for revolution with the shaft 47 but adapted to slide thereon by the usual key and slot connection, as seen at 54 in Fig. 2. The hub 53 has annular groove 55 in which is connected the free end of a lateral arm 56 projecting from the upright 57, the upper and lower ends of which are loosely mounted in horizontal members 58 and 59 as seen best in Fig. 4, so that the member 57 is free to oscillate back and forth for a purpose hereinafter described, that is, for re-winding.

The hub 53 carries a lateral projecting pin 60 (see Fig. 2) designed for contact and cooperation with an oppositely extending pin 61 carried by a sprocket wheel 62 loosely mounted on the shaft 47, and having a hub 63 with an annular groove 64 in which engages the forked member 65 secured on the upright member 66 of the frame, all as seen in Fig. 2.

67 is a collar on the shaft 47 to prevent endwise movement of the shaft, and upon the outer end of this shaft is a fixed suitable means as a sprocket wheel 68 designed to be revolved from the medium of a motor or other suitable source of power.

It is to be understood that the shaft 47, has, at the other end within the box, a suitable collar similar to that just mentioned in order to limit the endwise movement of the shaft in the opposite direction.

Meshing with the pinion 52 is a gear 69, the hub 70 of which is mounted for sliding movement on the shaft 71 mounted in bearings in the uprights 25 and 66, as seen best in Fig. 2, said hub having an annular groove 72 in which is engaged the lateral arm 73 carried by and moving with the member 57, see Fig. 4. 74 is a stop collar on the shaft 71. The outer end of the shaft 71 projects through its bearing 75 as seen in Fig. 2 and is engaged by a spring 76 secured to the lower portion of the upright 66 of the frame. The shaft 71 is mounted for sliding endwise movement in its bearing, being retained in its innermost position by the spring 76. The bearing of the left-hand shaft of the take-up spool projects beyond the adjacent upright of the music spool box as seen in Fig. 1 and is engaged by the head 77 of a screw 78 adjustable in said upright to hold the bearing in a given position, the spring 76 serving as a thrust to keep the take up spool in its proper position to the left.

Projecting from the gear 69 is a pin 79, see Fig. 2, adapted for cooperation with a pin 80 projecting from the brake disk 81, the hub 82 of which is secured rigidly to the shaft 71. Cooperating with this disk 81 is a brake 83 which is pivotally mounted as at 84 and normally pressed downward at its forward end by a spring 85, see Figs. 1, 2 and 4, so as to force the rear end of the brake member 83 against the lower periphery of the disk 81 for the re-winding. The forward end of this brake member has a depending portion 86, as seen best in Fig. 4, which is designed to be engaged and lifted by a member 87 carried by the oscillatory member 57.

88 is an arm carried by the oscillatory member 57 and designed to be actuated in any suitable manner to shift the gears 69 and 52 which move in unison to throw them in position for winding or re-winding.

89 is a finger projecting from the oscillatory member 57 designed to engage the arm 16 when the member 57 is oscillated for re-winding and serving to move in opposite directions the edge guides to throw them out of contact with the music sheet.

The two uprights 25 and 66 are connected by the horizontal members 90 and 91 as seen clearly in Fig. 1, one near the upper end and the other near the lower end, the latter having attached thereto, by any suitable means as at 93, the member 59, while the member 58 in which the upper end of the member 57 is mounted is secured to the member 91 by suitable means as at 94, see Fig. 9.

95 is an idler carried by the arm 96 of the looped member 97 which is adjustably secured to the member 91 by the screw 94 which secures the member 58 to said member 91. This is also clearly shown in Fig. 9. Depending from the member 58 is a suitable member 98 having a lateral portion 99, the end of which is disposed in the path of the member 22 as shown in Fig. 9, to serve as a stop to limit the swinging movement of said member 22.

The idler 95 is adapted for cooperation with a chain 100 as seen in Fig. 3, the said chain connecting the sprocket 62 with the sprocket 101 on the shaft 102 mounted in the members 25 and 66 near their upper ends. This shaft 102 is adjustable as to length for the purpose of adjustment in installing the mechanism on different widths of boxes.

103 is a brake disk which is loosely mounted on the shaft 102 and adapted for revolution between brake members 104 and 105 grooved upon their adjacent faces and in said grooves are disposed friction pads 106 of any suitable material against which the periphery of the disk 103 contacts. The members 104 and 105 are connected substantially near their mid-height by a rod 107 loosely received in said members and around which is a spring 108 adjustable by a nut 109, as seen clearly in Fig. 4, the outer end of the screw being threaded as at 110, see Fig. 4, for this purpose. The lower ends of the members 104 and 105 are pivoted on the rod 111 which is mounted in the member 91 as seen in Fig. 4.

Upon one side of the disk 103 secured to the shaft 102 in any suitable manner, is a collar 112, said collar being adjustable to prevent endwise movement. 113 is a ratchet which constitutes a part of the disk 103 being disposed to one side thereof, as shown in Fig. 2 and movable with the disk 103. 114 is a collar fastened to the shaft 102 and pivotally mounted on a projection 115 of this collar, on a pivot 116, is a dog or pawl 117 designed for cooperation with the ratchet 113, as will be seen from Fig. 2. The shaft 102 serves to revolve the member 3 to revolve the music roll or spool in a manner common in this art. The shaft 102 is mounted for endwise movement in its bearings and adjustment thereof as to length is provided for making the said shaft in two parts, the part 118 of which is received near the bore of the adjacent end of the other part, the two parts being secured in adjusted position by a screw 120 passed through a collar 119 and engaging the part 118 of the shaft in an obvious manner. The section 118 of this shaft is provided with a hole 121 for the reception of a suitable instrument for the adjustment of the shaft sections.

The outer end of this shaft extends through the upright 66 and through a suitable bearing 122, see Fig. 2, the projecting end being engaged by the depending portion 123 depending from a yoke 124 pivotally mounted on a pivot 125 supported in an oppositely disposed yoke 126, seen best in Fig. 5. The yoke 124 has the front end thereof extended as seen best in Fig. 5 to form the arm 127 to which is connected one end of the substantially vertical rod or the like 128, see Fig. 2, the lower end of which is connected as at 129 with the lug 130 of a segment 131 mounted for revolution on a pin 132 mounted in the upright 66 as seen clearly in Fig. 3. The segment 131 is provided upon its rear face near one edge with a beveled portion 133, see Fig. 8, and with which is designed to engage the beveled end 134 of the arm 26, previously described.

Cooperating with the segment 131 is a pinion 135 on a shaft 136 mounted at one end for revolution in the member 66 of the frame. The other end of this shaft 136 is mounted in the up-turned end 137 of the curved extension 138 of the member 58 as seen clearly in Fig. 4. This shaft 136 carries a gear 139 revolvably therewith and meshing with a pinion 140 on the shaft 28 of the friction member 30, see Figs. 2 and 4.

A lateral projection 141 from the member 115 as shown in Figs. 1 and 4 serves as a stop to limit the outward movement of the dog or pawl 117 to prevent the dog from swinging out of position on the re-wind.

In lieu of the segment and gear mechanism above described for controlling the movements of the music sheet laterally I may sometimes employ the mechanism shown in Figs. 12 and 13, to which attention is now directed.

In this form all of the parts not now to be particularly described, are the same as in the form which has been described in detail.

It is to be understood that the transmission and tracker mechanisms are all carried by a frame similar in practically all particulars to that hereinbefore described, all being removable with the frame, and the front upright member removable from the other parts and carrying some of the parts of the mechanisms.

The shaft 142 with its ratchet and pawl mechanism, sprocket wheel and brake, etc., are all substantially the same as in the form above described, and all operate in the same way. The shaft 143 similar in all respects to the shaft 28 in the above described form is provided with a collar 143$^a$ to which is fastened one end of a ligament 144 the other end of which is connected with the end of the long arm 145 of a bell crank lever the short arm 146 of which is provided with a link or the like 147, which in turn is connected with the end of the long arm 148 of a member having an arm 149 journalled in the arms 150 and 151 supported on the upper end of the upright 66 of the frame. The bell crank lever is mounted at its bend on a horizontal member 152 supported in the upright 66 as seen clearly in Fig. 12 so as to freely swing on the same as a pivot.

The end of the shaft 142 projects beyond the upright 66 as seen in Fig. 12 and this extended end is engaged by a pendent arm 153 mounted on the cross portion of the member to which the link 147 is attached as seen clearly in Fig. 12, and secured to oscillate therewith.

154 is a spring interposed between the upright 66 and the arm 153 as seen best in Fig. 12, and serving to keep the member 153 in its outermost position to keep the ligament 144 taut and prevent the ligament from becoming entangled in the gears or other parts of the mechanism.

On the end of the music spool box is a projection 155 disposed in the path of the arm 145 to limit the upward movement of the said arm when the ligament is unwound.

155ª is a friction disk with which cooperates the friction member 156. These two friction members are adapted to operate in the same manner as the corresponding members of the friction element above described, but differing somewhat in its structure, in the present instance the member 156 having at each end a pivotally mounted shoe or the like 157, each mounted on a pin or the like 158, held in the end of the said member 156, as seen in Fig. 12.

With the parts constructed and arranged substantially as above described, having reference to the form first described, the operation, briefly stated, is as follows:—

The music spool or roll is inserted in the usual manner and the music sheet connected with the take-up spool or roll as usual. The sprocket or the like 68 and its shaft being revolved in any well known way, the music sheet is unwound from the music spool and wound up on the take-up spool or roll, as it is drawn over the tracker bar, being confined between the edge guides. The normal tendency of the music spool is to move to the right by reason of the spring 5 acting upon its pintle. During the playing, as the sheet is unwound from the music spool, any infinitesimal pressure of the music sheet against the left hand edge guide will release the pressure of the friction element 30 on the friction element track 43, sufficient to allow of a slight slippage of the said element 30, allowing the music roll or spool to move to the right, releasing the pressure on the left edge guide and applying the pressure to the right hand edge guide, immediately increasing the friction between the two elements and causing a slight rotation in the opposite direction, carrying the music spool back again to the left. This fluctuation is more or less according to the condition of the sheet on the music spool, thus immediately taking care of any inaccuracies in the music sheet or its winding on the spool.

It is to be understood that the friction member 35 is continuously revolving in the one direction and that the pressure on the left hand edge of the music sheet toward the left causes the friction member 30 to decrease its frictional engagement with the track 43, the spring 41 tending to press the member 42 to the right to take care of lost motion between the parts, the spring 21 being the power spring forcing the left hand edge guide to the right, and moving the member 16 on its pivot and forcing the right hand edge guide to the left. This applies pressure to the member 16 and through the same to the member 22, overcoming the force of the spring 41 and increasing the frictional engagement between the members 30 and 43. This carries the music spool to the left. This fluctuation continues in accordance with the condition of the sheet and its winding on the spool.

When the roll of music has been played the re-wind lever 88 is moved to the right, moving the member 57 so as to throw the pins 79 and 80 out of engagement and throwing the pins 50 and 51 out of engagement and at the same time throwing the pins 60 and 61 into operative engagement with each other. By this movement, the member 89 is moved against the arm 16 thus causing separation of the edge guides out of engagement with the edges of the music sheet during re-winding. Upon the rewind the disk 103 remains stationary, the pawl or dog 117 being thrown out of operative engagement with the ratchet 113 as will be readily understood from Fig. 4.

In order to take the resistance from the driving means for the sprocket 68 in case the left hand edge of the music sheet should be torn and the sheet is carried to the extreme left the arm 26 comes in contact with the beveled edge portion 133 of the segment 131, preventing any further movement of the music spool or roll to the left and at the same time lessening the frictional contact of the members 30 and 35, thereby easing up on the motor or other motive power employed. When the segment has turned enough to contact with the end of the arm 26 the latter causes the member 22 to move slightly on its pivot to the left enough to move its other end sufficient to decrease the frictional contact of the member 30 with the track 43 of the friction member 35.

In order to limit the outward movement of the segment to prevent injury or damage to the segment, which might occur if the same were to go beyond the predetermind point, I provide the segment and the upright 66 with cooperating curved slot and pin or the like 131ª and 131ᵇ which will serve to bring the segment to a full stop at the proper point; this forms a positive stop for the segment.

Referring now to Figs. 12, 13 and 14, the function of the modified parts shown therein is substantially the same as that above described in connection with the other form. With the parts in the position in which they are shown in Fig. 13, with the ligament 144 unwound and the member 145 at its uppermost limit and with the music spool inserted and at the extreme right, and the motor started, the music sheet being drawn over the tracker bar its right hand edge will first contact with its edge guide and throw the left hand edge guide off from the left hand edge of the sheet; by further movement of the music sheet and the actuating parts of the mechanism the ligament will be wound upon its shaft and the sheet still traveling to the left, until the left hand edge guide contacts with the left hand edge of the sheet and has moved far enough to equalize the pressure of the two edge guides upon opposite edges of the sheet which will in turn decrease the frictional contact of the members of the friction element, thereby stopping any further lateral movement of the sheet in either direction with the exception, as stated in the description of the form previously explained, that pressure of the sheet is exerted upon one edge or the other, causing a slight lateral movement of the music roll or spool through the medium of the mechanism controlling and operating the same. The lateral movement of the sheet on the tracker bar is very slight, so slight, in fact, that it is hardly perceptible to the naked eye.

Modifications in details of construction, arrangement of parts, etc. may be resorted to without departing from the spirit of the invention, or sacrificing any of its advantages.

What I claim as new is:—

1. In a device of the character described, making use of a perforated sheet and rolls for winding and rewinding the same, a frame, and transmission and tracking mechanism carried by said frame, the said frame constituting in part portions of said mechanisms and detachable to provide ready access to the other parts.

2. In a device of the character described, employing a perforated sheet, a frame, transmission and tracking mechanisms mounted in said frame, said frame constituting in part portions of said mechanisms, one portion of said frame being detachable from the other parts and carrying some of the parts of said mechanisms.

3. In a device employing a perforated sheet and mechanisms for actuating and controlling the movements of said sheet, a frame attachable to the supporting member of said device, transmission mechanism carried by said frame, tracker mechanism carried by said frame, a portion of said frame and parts of the transmission mechanism being detachably mounted as a whole.

4. In a device employing a perforated sheet, and a multiplicity of rolls, a frame detachable from the support of said device, and transmission and tracker mechanisms operatively interconnected and all carried by said frame, the latter, in part, constituting portions of said mechanisms.

5. In a device employing a perforated sheet and mechanisms for actuating and controlling the movements of said sheet, a detachable unit embodying a frame and tracker mechanism carried thereby and involving a variable friction element, the members of which are in constant contact with each other, said frame forming a cooperating part of the transmission mechanism of an automatic music player.

6. In a device employing a perforated sheet and a transmission mechanism, a frame in which the transmission mechanism is mounted, and a tracker mechanism also mounted in said frame and embodying a friction element the members of which are in constant contact with each other, said frame and mechanisms being demountable as a unit.

7. In a device of the character described, a detachable unit embodying a frame, comprising spaced apart upright members, lateral members joining the upright members, and transmission and tracker mechanisms supported by said upright and lateral members and removable as an entirety with said frame.

8. In a device of the character described, a frame, and transmission and tracker mechanisms supported therein, each as a whole being mounted independently of the other and cooperable in action.

9. In a device of the character described, a frame element, a sheet registration element mounted thereon, a complemental frame element, a sheet registration element supported thereon, and cooperating means interposed therebetween.

10. In a device of the character described, a frame element, a sheet registration element mounted therein, a supplemental frame element, a sheet registration element mounted therein, and interposed cooperating elements, all disposed between said frame elements.

11. In a device of the character described, a frame element, a sheet registration element mounted therein, a supplemental frame element, a sheet registration element mounted therein, and interposed cooperating elements, all disposed between said frame elements, and transmission mechanism supported between said frame elements.

12. In a device of the character described, a frame, and transmission and tracker mechanisms supported therein, each as a whole being mounted independently of the other and cooperable in action, said mechanism being disposed between the opposed frame elements.

13. In a device of the character described, a detachable unit embodying a detachable frame, sheet registration means mounted therein, spaced from each other, and an interposed member cooperable with said spaced apart means.

14. In a device of the character described, a detachable unit embodying a detachable frame, sheet registration means mounted therein, spaced from each other, and an interposed rockable member cooperable with said spaced apart means.

15. In a device of the character described, a detachable frame unit, sheet registration means therein, involving spaced apart members, transmission mechanism cooperable with one of said members and means cooperable with and interposed between said members.

16. In a device of the character described, a detachable frame unit, sheet registration means therein, involving spaced apart members, transmission mechanism cooperable with one of said members, and rockable means cooperable with and interposed between said members.

17. In a device of the character described, a frame attachable to a fixed support, revoluble means mounted in one member of said frame, sheet moving means mounted on another member of said frame, and connections between said means for moving the sheet laterally.

18. In a device of the character described, a frame attachable to a fixed support, revoluble means mounted in one member of said frame, sheet moving means mounted on another member of said frame, and connections between said means engageable with the end of the music spool moving means.

19. A frame having two opposed members, frame elements for securing said members together, and transmission and sheet controlling mechanisms supported by said frame and said frame elements and parts removable with the frame members.

20. A frame having two opposed members, frame elements for securing said members together, and transmission and sheet controlling mechanisms supported by said frame and said frame elements, and frame elements carrying movable parts of the transmission and tracker mechanisms and said parts removable with said frame members.

21. In a device of the character described, a frame attachable to some fixed support, upper and lower spool shafts mounted therein, a drive shaft located intermediate the same, intermeshing gears slidable on the lower and intermediate shafts, and an oscillatory member operating to move said gears along their shafts.

22. In a device of the character described, a frame attachable to some fixed support, upper and lower spool shafts mounted therein, a drive shaft located intermediate the same, intermeshing gears slidable on the lower and intermediate shafts, and an oscillatory member operating to move said gears along their shafts, and a tracker mechanism constructed and arranged to be inoperative on the rewind.

23. In a device of the character described, a frame, transmission and sheet registering mechanisms mounted therein and removable therewith, the latter embodying a rockable shaft and an arm pivotally mounted thereon, and a pendent member cooperable with said shaft to limit the movement thereof.

24. In a device of the character described, a frame, transmission and sheet registering mechanisms mounted therein and removable therewith, the latter embodying a rockable shaft and an arm pivotally mounted thereon, and a pendent member cooperable with said shaft to limit the movement thereof, and an oscillatory re-wind control member.

25. In a device of the character described, transmission mechanism, a rotatable brake member on the music spool shaft, and pivotally mounted brake arms between which said brake member is disposed.

26. In a device of the character described, transmission mechanism, a rotatable brake member on the music spool shaft, and pivotally mounted brake arms between which said brake member is disposed, and means for adjusting the pressure of the brake arms on the said brake member.

27. In a device of the character described, sheet registering mechanism embodying a friction element, and a pivotally supported ligament adapted to be wound and unwound on the shaft thereof, and transmission mechanism, all carried by a detachable supporting frame.

28. In a device of the character described, sheet registering mechanism embodying a friction element, and a pivotally supported ligament adapted to be wound and unwound on the shaft thereof, and transmission mechanism, all carried by a detachable supporting frame, and means operable through the medium of said ligament for giving endwise movement to the music spool.

29. In a device of the character described, a frame attachable to some fixed support, transmission mechanism in said frame, revoluble friction mechanism supported in said frame, and sheet registering means embodying a pivoted member and a ligament carried thereby and connected to wind upon the shaft of the friction element.

30. In a device of the character described, a frame attachable to some fixed support, transmission mechanism in said frame, revoluble friction mechanism supported in said frame, and sheet registering means embodying a pivoted member and a ligament carried thereby and connected to wind upon the shaft of the friction element, and means cooperable with said pivoted member for engagement with the end of the music spool shaft.

31. In a combined transmission and tracker mechanism for player pianos in which a laterally-movable music sheet is mounted for lateral movement with its spool for insuring proper registration of the perforations of such sheet with the holes of a tracker bar, the combination with such spool of a rotatably mounted friction element, a cooperating friction element for frictional engagement therewith, and a pivoted mounting for the second-named element.

32. A construction in accordance with claim 31 in which the second-named element is rotatable in either direction.

33. A construction in accordance with claim 31 in which the second-named element is revoluble in a plane parallel with that of the first-named element and at all times in contact with each other.

34. A construction in accordance with claim 31 in which one of said elements is provided with a portion upon which the other element is adapted to travel.

35. A construction in accordance with claim 31 in which the second-named element has pivotally mounted shoes.

36. A construction in accordance with claim 31 in which one of the elements is provided with a track upon which the other element is adapted to travel, one of the elements being provided with pivotally-mounted shoes and said shoes being provided with reduced contacting portions.

In testimony whereof I affix my signature.

GEORGE P. BRAND.